Oct. 31, 1944.  G. P. DAIGER ET AL  2,361,748
DYNAMO ELECTRIC MACHINE
Filed Dec. 15, 1941  2 Sheets-Sheet 1
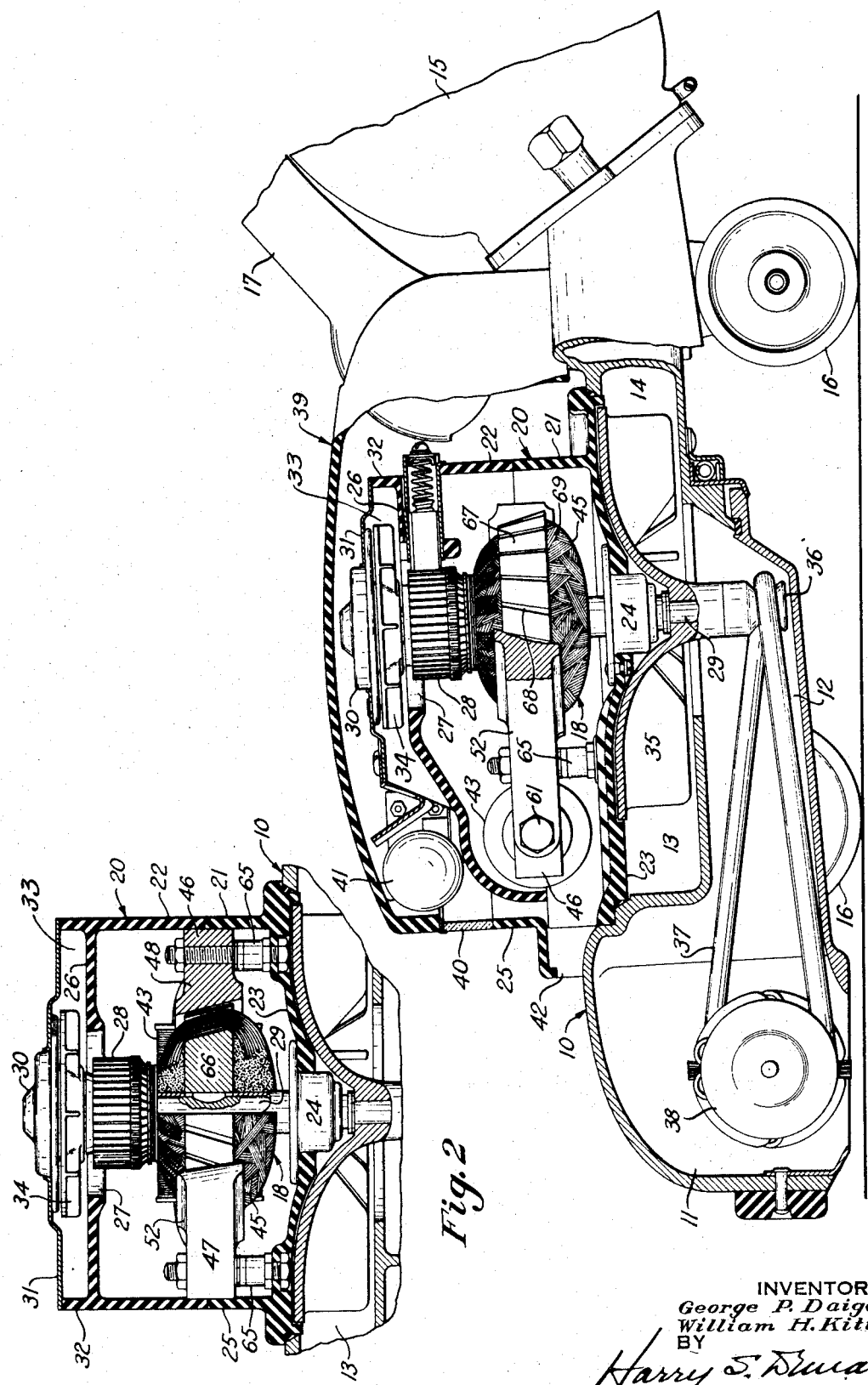
INVENTORS
George P. Daiger
William H. Kitto
BY
Harry S. Ducasse
ATTORNEY

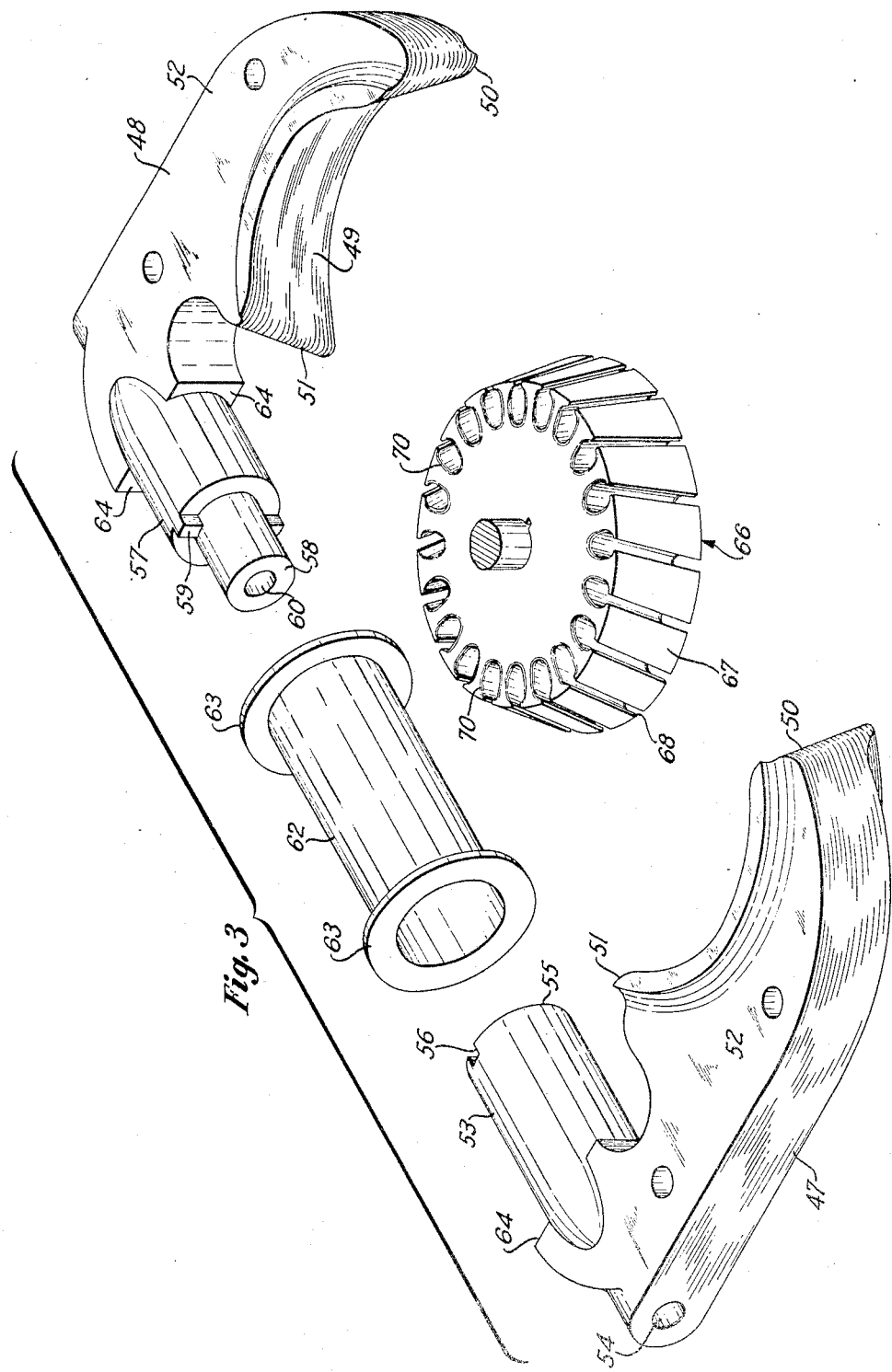

Patented Oct. 31, 1944

2,361,748

UNITED STATES PATENT OFFICE 2,361,748

DYNAMOELECTRIC MACHINE

George P. Daiger, Canton, and William H. Kitto, Greentown, Ohio, assignors to The Hoover Company, North Canton, Ohio, a corporation of Ohio Application December 15, 1941, Serial No. 423,006

1 Claim. (Cl. 172—36)

The present invention relates to suction cleaners and more particularly to electric motors therefor.

An object of the invention is to provide a new and improved suction cleaner. Another object is to provide a new and improved motor for suction cleaners. A further object is to provide armature and field cores molded from a compound of small particles or pulverized magnetic material mixed with an insulating binder such as a synthetic resin. Another object is to form the motor cores by sintering the magnetic particles with a cement to bind the particles together. A further object is to provide molded field and armature cores having skewed opposing surfaces for adjusting the air gaps therebetween. Another object is to provide skewed winding slots on the armature core. Another object is to provide a molded armature core having rounded corners at the ends of the winding slots for insulating the latter by dipping the armature core in an insulation, such as cellulose acetate, prior to winding the core. Another object is to provide a molded field core having pre-formed pole pieces and pre-wound field coils. Other objects and advantages of the invention will be apparent from the following specification and drawings, wherein:

Figure 1 is a side elevation, partly in section, of a motor embodied in a suction cleaner;

Figure 2 is a vertical section, partly in elevation, showing the skewed field and armature cores, and Figure 3 is a disassembled perspective view of the field and armature cores.

Referring to Figures 1 to 3, the embodiment of the invention therein disclosed comprises a suction cleaner having a casing 10 provided with a downwardly open nozzle 11, connected to a suction air passageway 12 communicating with a fan chamber 13 connected to an exhaust passageway 14 for discharging dirt-laden air into a filter bag 15 removably attached to the casing 10. The casing 10 is supported on wheels 16 and is propelled over the surface being cleaned by a handle 17 pivotally mounted on the casing, the handle 17 supporting the upper end of the bag 15.

A motor housing 20 is mounted on the cleaner casing 10 and includes lower and upper housing sections 21 and 22, respectively, formed from an insulating plastic such as Bakelite. The lower housing section 21 comprises a bottom wall 23 which forms the top wall of the fan chamber 13 and supports a lower bearing 24 for a motor 18. The upper housing section 22 is supported on the vertical annular wall 25 extending upwardly from the bottom wall 23 of the housing section 21, and the top wall 26 of the upper housing section 22 has an opening 27, the peripheral wall of which is spaced from the motor commutator 28. The upper end of the armature shaft 29 is supported in a top bearing 30 mounted on a plate 31 supported on an upstanding wall 32 of the housing section 22, the latter and the plate 31 forming a motor ventilating fan chamber 33 having a fan 34 mounted on the armature shaft 29. The motor 18 drives a fan 35 and a pulley 36 the latter being connected by means of a belt 37 to a surface agitating member 38 rotatably mounted in the nozzle 11. Enclosing the motor housing 20 is a casing 39 supported on the cleaner casing 10 and is provided with a transparent window 40 through which light rays are transmitted from an electric lamp 41 mounted on the motor housing 20.

The motor 18 is cooled by means of the fan 34 which draws air through an opening 42 in the lower casing section 21 and thence over a field core 43 into the fan chamber 33, the air being expelled over the lamp 41 and through an unshown opening in the housing 20.

The motor 18 is of the unicoil type and includes an armature 45 and a substantially U-shaped field core 46. The field core 46 is molded in two complementary sections 47 and 48. Each section is molded from a compound including small particles or pulverized magnetic metal such as iron, or an alloy, the particles being insulatably bonded together by means of an insulating binder as, for example, a synthetic resin. Each core section is molded to provide a pole face 49 between pole tips 50, 51 and the pole faces are skewed at an angle to the longitudinal axis of the armature shaft 29. The skewed pole faces 49 are of greater width than the remaining body portion 52 of the core sections 47 and 48. The core section 47 is molded to form a cylindrical bobbin support section 53 having a bore 54 therethrough and an unshown enlarged bore section at its end 55 in which is a diametrically arranged key slot 56. The other core section 48 is also molded with a bobbin support section 57 and a projecting pilot 58 of reduced diameter, and arranged on the latter is a key 59. A bore 60 extends through the projection 58 and the bobbin support section 57.

The molded core sections 47 and 48 are assembled by inserting the pilot 58 into the unshown enlarged recess in the bobbin support section 53 and are placed in proper alignment by fitting the key 59 into the slot 56. A bolt 61 extends through the openings 54 and 60 to rigidly secure the core sections together. Prior to assembling the core sections, a bobbin 62 of insulating material and pre-wound with the field coil 43 is placed on the bobbin support section 53, and when the core sections are assembled the flanges 63 of the bobbin abut the shoulders 64 at the inner ends of the bobbin support sections 53 and 57 to position the field coil with respect to the armature 45. The assembled field core is supported in the motor housing section 21 by means of bolts 65 extending through the molded field core and fastened to the bottom wall 23 of the housing section 21.

The armature 45 comprises a core 66 molded from a compound including small or pulverized particles of magnetic material, the particles being insulatably bonded together by an insulating binder as, for example, a synthetic resin. The peripheral surface 67 of the core is in the shape of a frustum of a cone and is provided with molded winding slots 68 which are disposed at an angle with the longitudinal axis of the armature shaft. A winding 69 is arranged about the molded core 66 and is connected to the commutator 28.

If desired the peripheral surface of the armature core and the pole faces may be molded for arrangement parallel to the armature shaft and not skewed at an angle as shown in Figures 1 to 3.

In molding the armature core 66, the opposite end corners 70 of the winding slots 68 are rounded whereby the core may be, for example, dipped in an insulating varnish or cellulose acetate and the armature field may then be wound directly thereon. Rounding the end corners of the winding slots prevents the insulating varnish from breaking at the corners to thereby provide a completely insulated armature core for the winding 69. The longitudinal walls of the winding slots 68 are molded to provide a smooth surface so that the insulating varnish completely covers the walls of the slots 68.

In assembling the armature and the field core, the conical surface 67 of the armature core 66 is placed between the inclined pole faces 49 of the field core and the air gap therebetween is adjusted by moving the field core and armature with respect to each other. It will be noted that the pole faces 49 are of greater width than the peripheral surface 67 of the armature core to provide for varying the air gap therebetween with consequent improvement in the flux distribution between the armature and the field.

The eddy current losses are greatly reduced since the opposing surfaces of the pole faces 49 and the peripheral surface 67 of the armature core 66 do not present solid surfaces of magnetic material. In providing the molded opposing surfaces 49 and 67, the particles of magnetic material are insulated from each other to prevent the formation of continuous electrical paths along these surfaces to thereby reduce eddy current losses.

We claim:

An armature for a dynamo-electric machine, comprising a core and its winding, said core having winding slots extending inwardly from the peripheral surface of the core, a coating of insulation material about said core and lining said winding slots, said core being composed of magnetic particles and an insulating binder molded together to form said winding slots and their opposite end corners rounded in a gradual curve extending longitudinally of said winding slots from the opposite ends of said winding slots to the end faces of said core, said molded curved surfaces providing surfaces to which said insulation will adhere without cracking.

GEORGE P. DAIGER.
WILLIAM H. KITTO.